(12) United States Patent
Yang et al.

(10) Patent No.: US 12,066,968 B2
(45) Date of Patent: Aug. 20, 2024

(54) COMMUNICATION INTERFACE STRUCTURE AND Die-to-Die PACKAGE

(71) Applicants: Global Unichip Corporation, Hsinchu (TW); Taiwan Semiconductor Manufacturing Company, Ltd., Hsinchu (TW)

(72) Inventors: Sheng-Fan Yang, Hsinchu (TW); Chih-Chiang Hung, Hsinchu (TW); Yuan-Hung Lin, Hsinchu (TW); Shih-Hsuan Hsu, Hsinchu (TW); Igor Elkanovich, Hsinchu (TW)

(73) Assignees: Global Unichip Corporation, Hsinchu (TW); Taiwan Semiconductor Manufacturing Company, Ltd., Hsinchu (TW)

( * ) Notice: Subject to any disclaimer, the term of this patent is extended or adjusted under 35 U.S.C. 154(b) by 155 days.

(21) Appl. No.: 17/863,408

(22) Filed: Jul. 13, 2022

(65) Prior Publication Data
US 2024/0020260 A1  Jan. 18, 2024

(51) Int. Cl.
*G06F 13/14* (2006.01)
*G06F 13/40* (2006.01)

(52) U.S. Cl.
CPC ...... *G06F 13/4068* (2013.01); *G06F 2213/40* (2013.01)

(58) Field of Classification Search
CPC .................. G06F 13/4068; G06F 2213/40
See application file for complete search history.

(56) References Cited

U.S. PATENT DOCUMENTS

| | | | | |
|---|---|---|---|---|
| 9,343,418 | B2 * | 5/2016 | Lowney | H01L 24/11 |
| 2009/0034225 | A1 * | 2/2009 | Shoji | H01L 21/6835 |
| | | | | 29/877 |
| 2020/0107431 | A1 * | 4/2020 | Yang | H01P 3/026 |
| 2021/0375974 | A1 * | 12/2021 | Tanaka | H01L 24/05 |
| 2021/0398906 | A1 * | 12/2021 | Qian | H01L 23/5385 |

* cited by examiner

*Primary Examiner* — Henry Tsai
*Assistant Examiner* — Kim T Huynh
(74) *Attorney, Agent, or Firm* — JCIPRNET

(57) ABSTRACT

A communication interface structure and a Die-to-Die package are provided. The communication interface structure includes first bumps arranged in a first row-column configuration, second bumps arranged in a second row-column configuration, and conductive lines disposed between the first bumps and the second bumps to connect each of the first bumps to each of the second bumps. The first bumps in neighboring rows are alternately shifted with each other. The second bumps are disposed under or over the first bumps, wherein each of the second bumps in even rows is at a position shifted in a column direction from a center of each of the first bumps in the even rows, and each of the second bumps in odd rows is at a position between two of the second bumps in the even rows in the column direction.

18 Claims, 9 Drawing Sheets

COMMUNICATION INTERFACE STRUCTURE AND Die-to-Die PACKAGE

BACKGROUND

Technical Field

This invention relates to interface between two integrated circuit (IC) dies for data communication, and in particular relates to a communication interface structure and a Die-to-Die package.

Description of Related Art

The digital electronic apparatus based on semiconductor integrated circuit such as mobile phones, digital cameras, personal digital assistants (PDAs), and so on are designed to have to be more powerful functionalities to adapt various applications in the modern digital world. However, the digital electronic apparatus as the trend in semiconductor fabrication intends to be smaller and lighter, with improved functionality and higher performance. The semiconductor device may be packaged into a 2.5D semiconductor device, in which several circuit chips may be integrated as a larger integrated circuit, in which the contact elements, interposer or RDL layer are used to connect between the chips.

The packaging technology Integrated Fan-Out (InFO) and chip-on-wafer-on-substrate (CoWoS) have been proposed to package multiple chips assembled side by side.

As to Die-to-Die package, the GLink (UCIe compliance) Multi-die interlink as an example may need connect a SOC (system on a chip) die to a HBM (high bandwidth memory) die through an interposer layer or a redistribution layer (RDL). In other words, the interface in the interposer layer or RDL includes many bumps and traces to connect therebetween.

Stagger bump assignment in the interface has been developed for vias at silicon routability. The stagger bump map has more beachfront efficiency than in-line bump map. However, in the stagger bump assignment, only one trace can be afforded on each interface in W-E (west-east) orientation. In other words, at GLink multi-die interlink design at Advanced Packaging Technology (APT), the ubump map only can support one direction (e.g., North-South orientation) of high speed interconnection.

To enhance signal integrity between the HBM die and the SOC die, the communication interface structure of the RDL needs to be properly designed.

SUMMARY

The invention provides a communication interface structure with enhanced signal integrity performance.

The invention further provides a Die-to-Die package for West-East interconnection.

According to an embodiment of the invention, a communication interface structure includes a plurality of first bumps, a plurality of second bumps disposed under or over the plurality of first bumps, and a plurality of conductive lines disposed between the plurality of first bumps and the plurality of second bumps to connect each of the first bumps to each of the second bumps. The plurality of first bumps are arranged in a first row-column configuration, wherein the first bumps in neighboring rows are alternately shifted with each other. The plurality of second bumps are arranged in a second row-column configuration. Each of the second bumps in even rows is at a position shifted in a column direction from a center of each of the first bumps in the even rows. Each of the second bumps in odd rows is at a position between two of the second bumps in the even rows in the column direction.

According to another embodiment of the invention, a Die-to-Die package includes a first die and a second die, and a communication interface structure for connecting the first die to the second die. The communication interface structure includes a plurality of first bumps, a plurality of second bumps, and a plurality of conductive lines disposed between the plurality of first bumps and the plurality of second bumps to connect each of the first bumps to each of the second bumps. The plurality of first bumps are arranged in a first row-column configuration, wherein the first bumps in neighboring rows are alternately shifted with each other. The plurality of second bumps are arranged in a second row-column configuration and disposed under or over the plurality of first bumps. Each of the second bumps in even rows is at a position shifted in a column direction from a center of each of the first bumps in the even rows. Each of the second bumps in odd rows is at a position between two of the second bumps in the even rows in the column direction.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
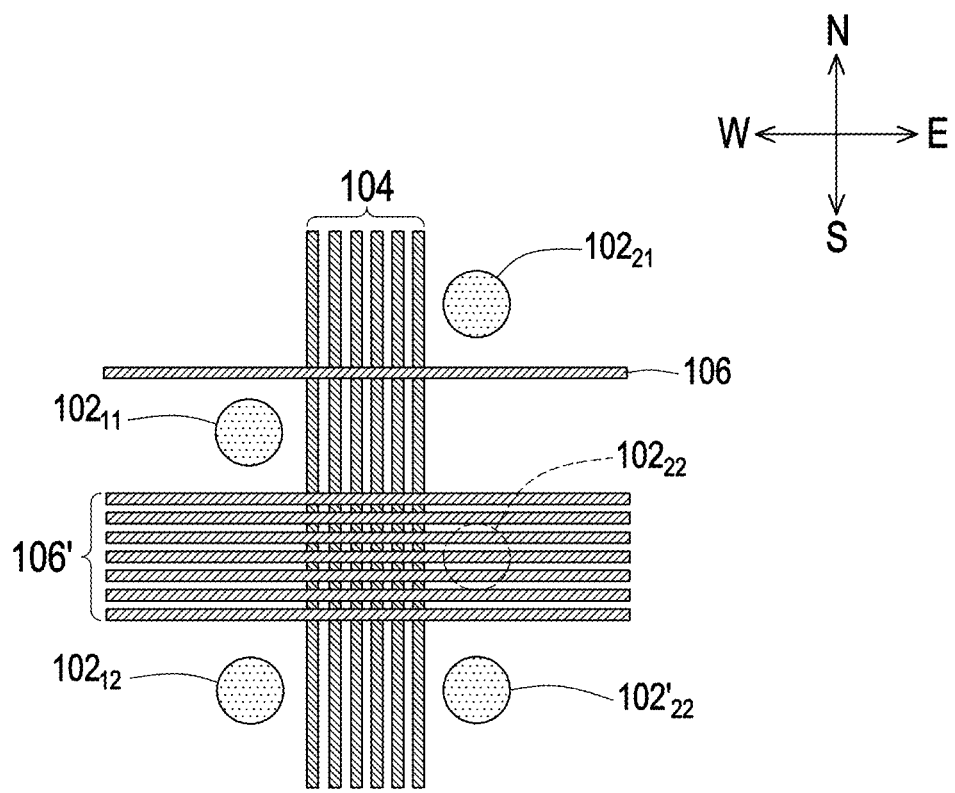
FIG. 1 is a partial plane view of a communication interface structure according to the invention.

The invention may be more fully described below with reference to the drawings of the embodiments. However, the invention may be embodied in a variety of different forms and should not be limited to the embodiments described herein. The thickness of layers and regions in the drawings may be exaggerated for clarity. Identical or similar elements are given identical or similar reference numerals in any of the following embodiments. In this regard, directional terminology, such as up, down, left, right, top, bottom, etc., may be used with reference to the orientation of the Figure(s) being described. The components provided in one or some embodiments of the invention may be positioned in a number of different orientations. As such, the directional terminology may be used for purposes of illustration and is in no way limiting.

FIG. 1 is a partial plane view of a communication interface structure according to the invention.

Referring to FIG. 1, the concept of the communication interface structure in the invention is to change the positions of the bump. For example, four bumps $102_{11}$, $102_{12}$, $102_{21}$ and $102_{22}$ are arranged in a row-column configuration. In N-S(north-south) orientation, there is space for several traces 104 to pass between the bumps $102_{11}$ and the bump $102_{21}$. However, in W-E (west-east) orientation, only one trace 106 can be afforded between the bumps $102_{11}$ and the bump $102_{21}$. Accordingly, in the invention, the bump $102_{22}$ may be moved down to a position aligned with the bump $102_{12}$, and thus the space between the bumps $102_{21}$ and the bump $102_{22}$' can be expanded for more traces 106' to pass at W-E orientation.

Following the above concept, embodiments of the invention are as follows.

Figure 2:
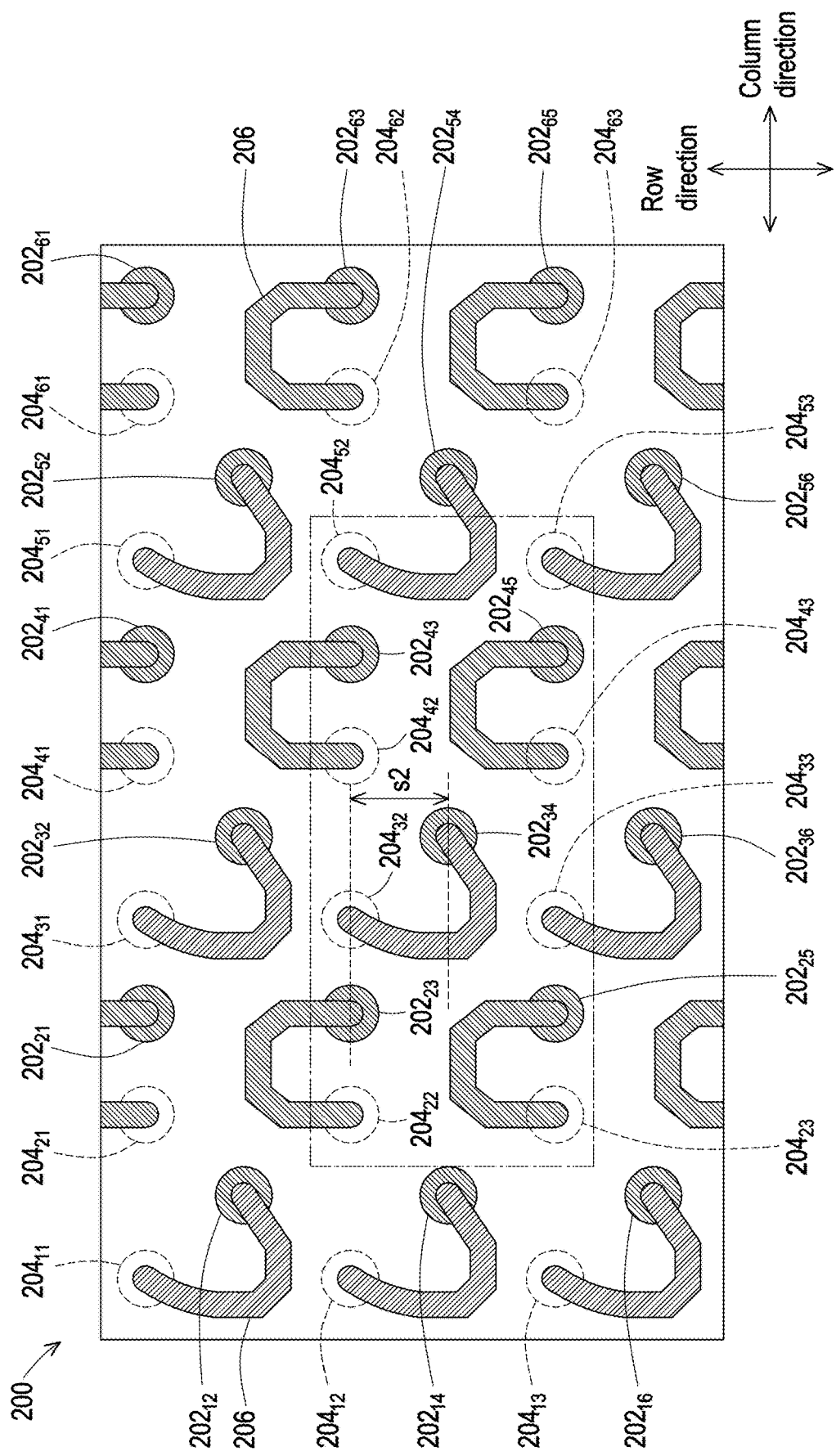
FIG. 2 is a plane view of a communication interface structure according to a first embodiment of the invention.

FIG. 2 is a plane view of a communication interface structure according to a first embodiment of the invention.

Referring to FIG. 2, the communication interface structure 200 is suitable to connect two dies, and the communication interface structure 200 includes a plurality of first bumps $202_{12}$, $202_{14}$, $202_{16}$, $202_{21}$, $202_{23}$, $202_{25}$, $202_{32}$, $202_{34}$, $202_{36}$, $202_{41}$, $202_{43}$, $202_{45}$, $202_{52}$, $202_{54}$, $202_{56}$, $202_{61}$, $202_{63}$ and $202_{65}$, a plurality of second bumps $204_{11}$, $204_{12}$, $204_{13}$, $204_{21}$, $204_{22}$, $204_{23}$, $204_{31}$, $204_{32}$, $204_{33}$, $204_{41}$, $204_{42}$, $204_{43}$, $204_{51}$, $204_{52}$, $204_{53}$, $204_{61}$, $204_{62}$ and $204_{63}$, and a plurality of conductive lines 206. Even though FIG. 2 is the plane view, it is shown that the second bump $204_{11}$ is disposed under the first bump $202_{12}$, and so on. However, the invention is not limited herein; in another embodiment, the second bump can be disposed over the first bump. The plurality of first bumps $202_{12-65}$ are arranged in a first row-column configuration. In other words, the first bumps $202_{12}$, $202_{14}$ and $202_{16}$ in the first row are alternately shifted with the first bumps $202_{21}$, $202_{23}$ and $202_{25}$ in the second row neighboring to the first row. In one embodiment, the first bumps $202_{21}$, $202_{41}$ and $202_{61}$ in the first column are alternately shifted with the first bumps $202_{12}$, $202_{32}$ and $202_{52}$ in the second column neighboring to the first column. In one embodiment, the first bumps in the odd rows are aligned with each other, and the first bumps in the even rows are aligned with each other. For example, the first bumps $202_{12}$ in $1^{st}$ row is aligned with the first bumps $202_{32}$ in $3^{rd}$ row, and the first bump $202_{21}$ in $2^{nd}$ row is aligned with the first bump $202_{41}$ in $4^{th}$ row.

Referring to FIG. 2 again, the plurality of second bumps $204_{11-63}$ are arranged in a second row-column configuration. Each of the second bumps in even rows is at a position shifted in a column direction from a center of each of the first bumps in the even rows. For example, the second bump $204_{21}$ in $2^{nd}$ row is at a position shifted in the column direction from a center of the first bump $202_{21}$ in $2^{nd}$ row; the second bump $204_{22}$ in $2^{nd}$ row is at a position shifted in the column direction from a center of the first bump $202_{23}$ in $2^{nd}$ row, and so on. Therefore, in the first embodiment, a column number of the plurality of second bumps $204_{11-63}$ is a half of a column number of the plurality of first bumps $202_{12-65}$. In this case, a row number of the plurality of second bumps $204_{11-63}$ is the same as a row number of the plurality of first bumps $202_{12-65}$.

In FIG. 2, each of the second bumps in odd rows is at a position between two of the second bumps in the even rows in the column direction. For example, the second bump $204_{31}$ in $3^{rd}$ row is at a position between the second bumps $204_{21}$ in $2^{nd}$ row and the second bumps $204_{41}$ in $4^{th}$ row in the column direction, and so on. The plurality of conductive lines 206 are disposed between the plurality of first bumps and the plurality of second bumps to connect each of the first bumps to each of the second bumps. For example, one of the plurality of conductive lines 206 is disposed between the first bump $202_{12}$ and the second bump $204_{11}$ to connect the first bump $202_{12}$ and the second bump $204_{11}$, and so on.

The communication interface structure 200 is, for example, an interposer or a redistribution layer (RDL). In particular, the plurality of first bumps $202_{12-65}$ may be formed at a top of the redistribution layer (not shown) to connect the vias of the dies (not shown), and the plurality of second bumps $204_{11-63}$ may be formed in the redistribution layer disposed under the plurality of first bumps $202_{12-65}$. The plurality of conductive lines 206 are formed in an insulation layer therebetween in order to connect each of the first bumps $202_{12-65}$ to each of the second bumps $204_{11-63}$. In one embodiment, each of the plurality of conductive lines 206 has a C-shaped or U-shaped in FIG. 2. For example, the first bump $202_{12}$ is located at a first end of the C-shaped conductive line 206, and the second bump $204_{11}$ is located at a second end of the C-shaped conductive line 206. However, the invention is not limited hereto; in another embodiment, each of the plurality of conductive lines 206 may be curved, wavy, or straight line.

Figure 3:
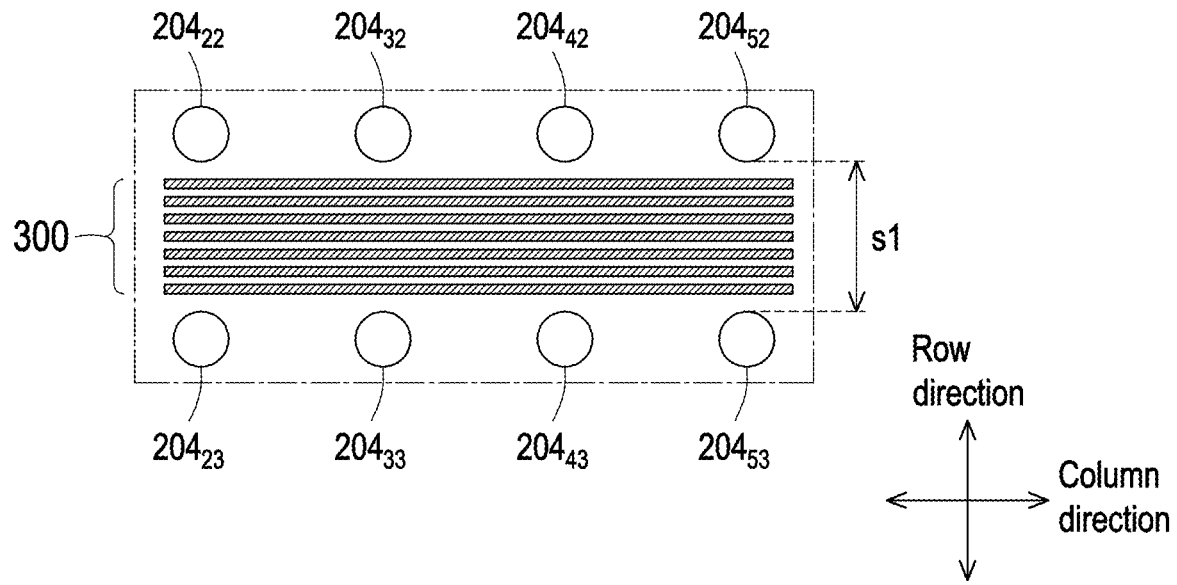
FIG. 3 is a partial view of the communication interface structure of FIG. 2.

FIG. 3 is a partial view of the communication interface structure of FIG. 2.

Referring to FIG. 3, a plurality of first traces 300 is disposed at west-east orientation (i.e. along the column direction) below the plurality of second bumps $204_{22}$, $204_{32}$, $204_{42}$, $204_{52}$, $204_{23}$, $204_{33}$, $204_{43}$ and $204_{53}$, and the plurality of first traces 300 are between the second bump $204_{22}$ and the second bump $204_{23}$. Since the stagger bumps (i.e. the first bumps $202_{12-65}$) are redistributed according to the communication interface structure of the first embodiment, the number of the first traces 300 can be increased in each RDL in W-E orientation, and thus the communication interface structure can enhanced signal integrity performance at W-E orientation.

Referring FIG. 2 and FIG. 3, a spacing s1 (in FIG. 3) between two of the plurality of second bumps (e.g. the second bump $204_{22}$ and the second bump $204_{23}$) in the row direction is longer than a spacing s2 (in FIG. 2) between one of the plurality of second bumps and one of the plurality of first bumps (e.g. the second bump $204_{32}$ and the first bump $202_{34}$) in the row direction. Accordingly, there is space for the plurality of first traces 300 to afford between two columns of the second bumps (e.g. $2^{nd}$ column of the second bumps $204_{22}$, $204_{32}$, $204_{42}$, $204_{52}$ and $3^{rd}$ column of the second bumps $204_{23}$, $204_{33}$, $204_{43}$ and $204_{53}$).

Figure 4:
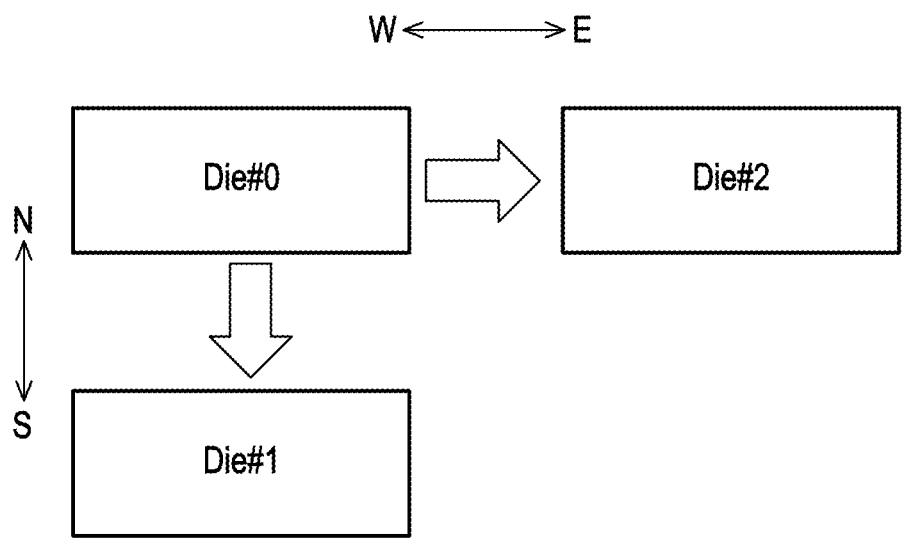
FIG. 4 is a block diagram of two-orientation interconnection according to the invention.

FIG. 4 is a block diagram of two-orientation interconnection according to the invention.

Referring FIG. 4, Die #0 can be connected to Die #2 at W-E orientation by using the communication interface structure of FIG. 2. Die #0 can be connected to Die #1 at N-S orientation by using a communication interface structure of FIG. 5.

Figure 5:
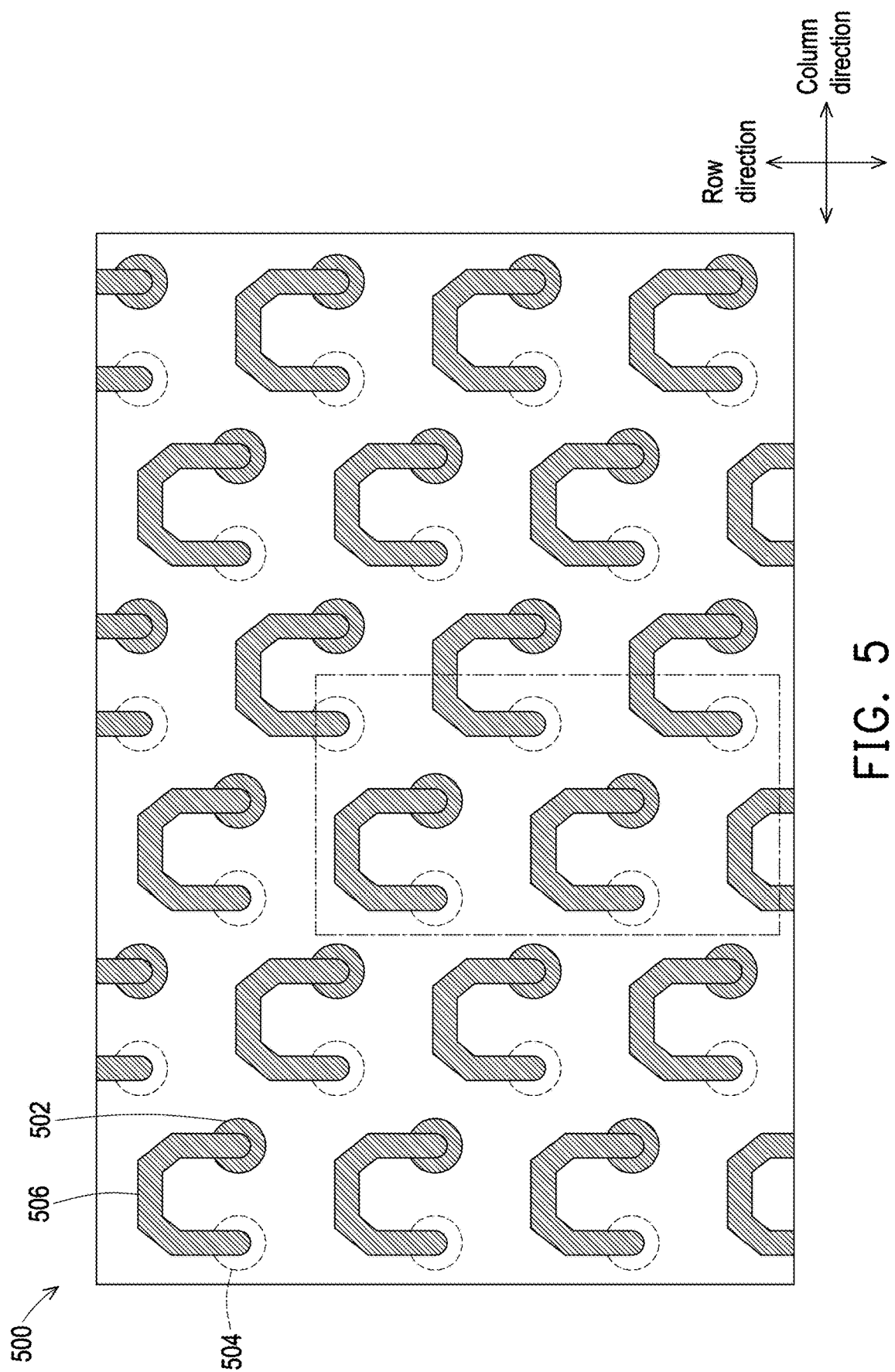
FIG. 5 is a plane view of a communication interface structure according to a second embodiment of the invention.

FIG. 5 is a plane view of a communication interface structure according to a second embodiment of the invention. In FIG. 5, the communication interface structure 500 includes a plurality of first bumps 502, a plurality of second bumps 504, and a plurality of conductive lines 506. The plurality of first bumps 502 and the plurality of second bumps 504 are arranged in the same row-column configuration. In other words, the plurality of first bumps 502 are stagger bumps, and the plurality of second bumps 504 disposed under or over the plurality of first bumps 502 are also stagger bumps. In one embodiment, each of the plurality of second bumps 504 is at a position shifted in a column direction from a center of each of the first bumps 502.

Figure 6:
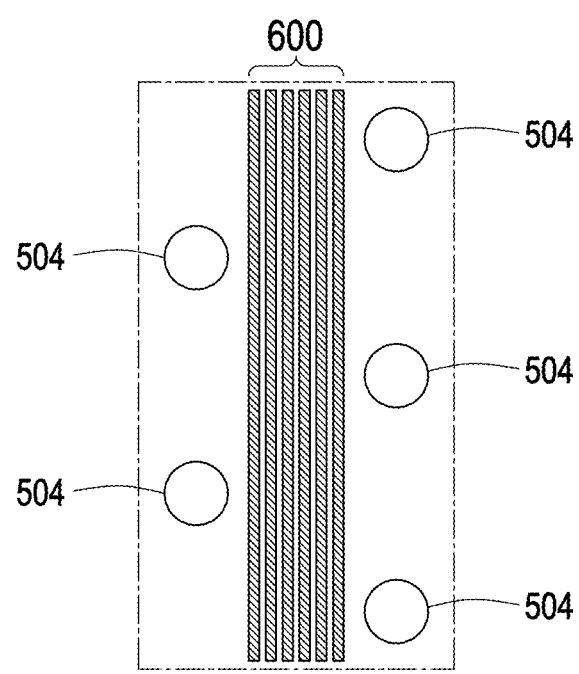
FIG. 6 is a partial view of the communication interface structure of FIG. 5.

FIG. 6 is a partial view of the communication interface structure of FIG. 5.

Referring to FIG. 6, a plurality of second traces 600 is disposed at north-south orientation (i.e. along the row direction) below the plurality of second bumps 504, and the plurality of second traces 600 are between two of the plurality of second bumps 504 in neighboring rows.

Figure 7:
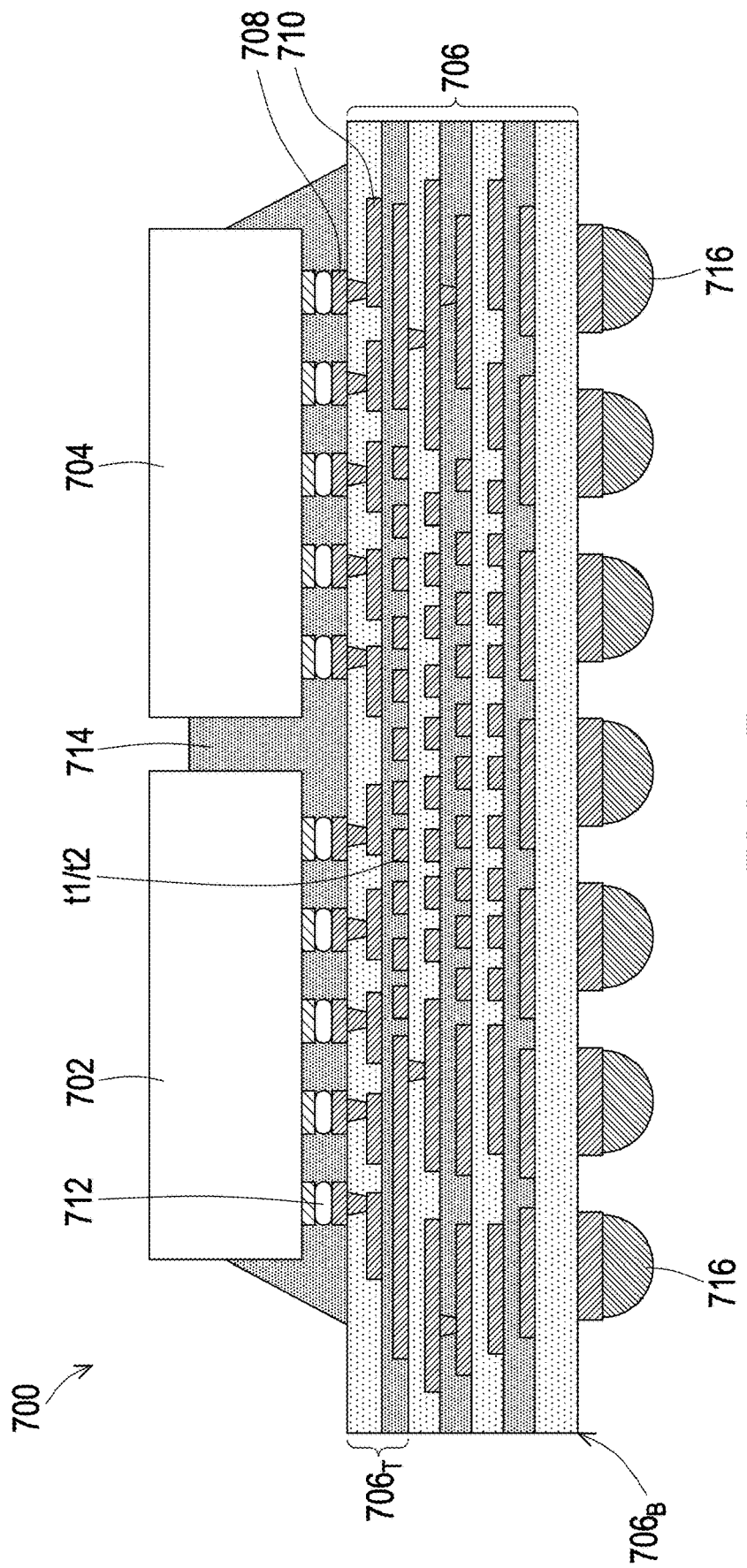
FIG. 7 is cross-sectional view of a Die-to-Die package according to a third embodiment of the invention.

FIG. 7 is cross-sectional view of a Die-to-Die package according to a third embodiment of the invention.

Referring to FIG. 7, a Die-to-Die package 700 includes a first die 702 and a second die 704, and a communication interface structure 706 for connecting the first die 702 to the second die 704, wherein the first die 702 is, for instance, a system on a chip (SOC) die, and the second die 704 is, for instance, a high bandwidth memory (HBM) die. The communication interface structure 706 may include the communication interface structure according to the first embodiment or the communication interface structure according to the second embodiment. For example, the communication interface structure 706 includes an interposer or a redistribution layer (RDL), and a top portion 706T of the communication interface structure 706 includes the communication interface structure 200 shown in FIG. 2. In other words, the top portion 706T includes a plurality of first bumps 708, a plurality of second bumps (not shown), and a plurality of conductive lines 710 disposed between the plurality of first bumps 708 and the plurality of second bumps to connect each of the first bumps 708 to each of the second bumps. In the third embodiment, the plurality of first bumps 708 are bonded to the first die 702 and the second die 704, respectively. The die-to-die package 700, for instance, includes an under bump metallization (UBM) structure 712 under the first die 702 and the second die 704 for bonding to the plurality of first bumps 708. In one embodiment, a plurality of first traces t1 is disposed at W-E orientation below the plurality of second bumps; alternatively, a plurality of second traces t2 is disposed at N-S orientation below the plurality of second bumps.

Referring to FIG. 7 again, the die-to-die package 700 further includes encapsulating layer 714 for encapsulating the first die 702 and the second die 704. The encapsulating layer 714 may include, for example, a molding compound, a PI, an epoxy-based material, a phenolic compound or material, a material with a silicone dispersed therein, or a combination thereof. Moreover, on the bottom portion 706B of the communication interface structure 706, electrical contacts 716 are further disposed to provide electrical connections between the Die-to-Die package 700 and external components (e.g. external circuits or circuit boards). The electrical contacts 716 may include a controlled collapse chip connection (C4) bump, a ball grid array (BGA) or a land grid array (LGA).

Figure 8:
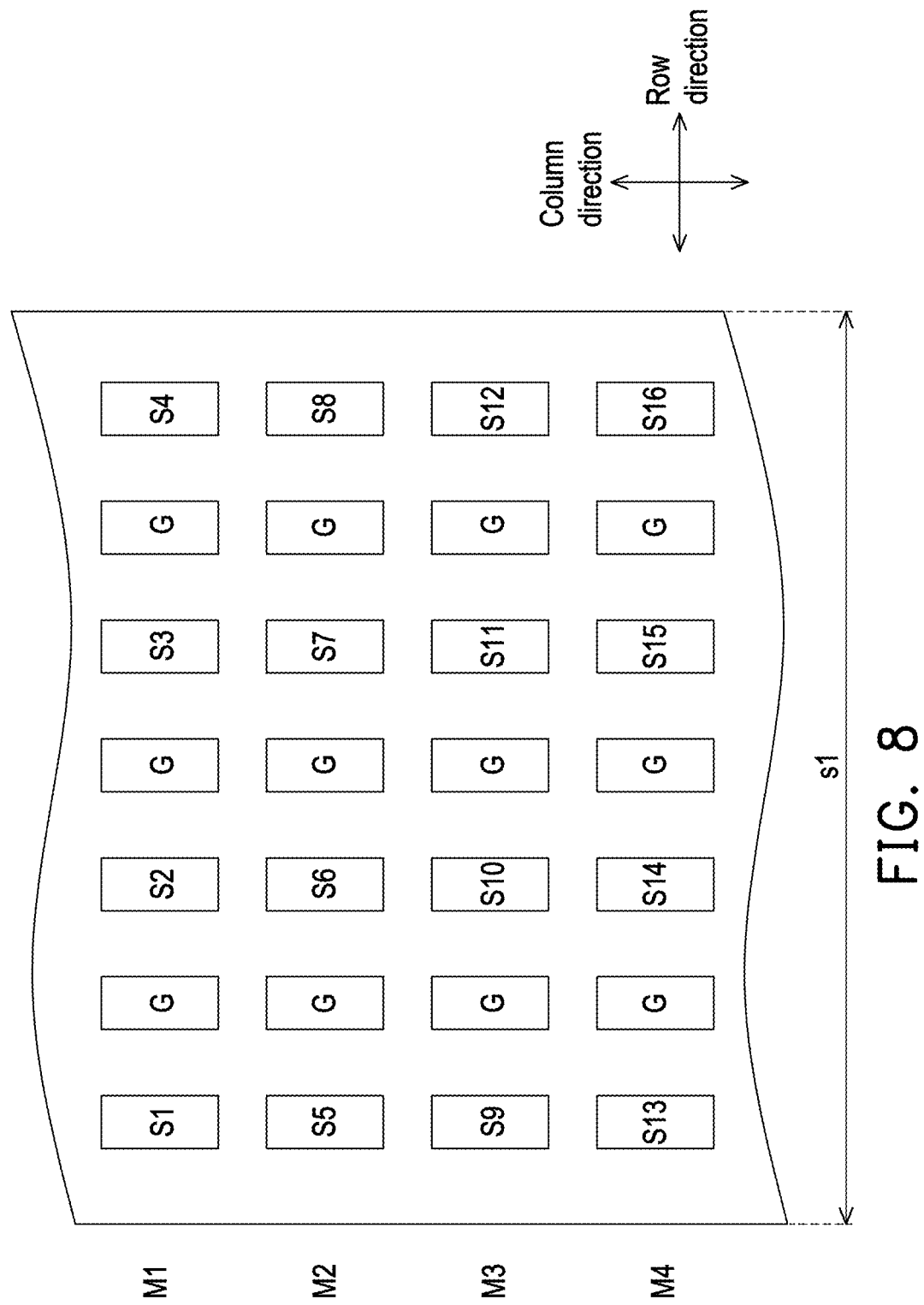
FIG. 8 is a block diagram of signal and ground traces in one example based on the first embodiment of the invention.

FIG. 8 is a block diagram of signal and ground traces in one example based on the first embodiment of the invention.

Referring to FIG. 8, Universal Chiplet Interconnect Express (UCIe) is utilized as the example. For UCIe package, the communication interface structure in the first embodiment of the invention can be used, and thus two-slice can achieve fully ground (GND) shielding topology for W-E interconnection. In FIG. 8, M1 represents a first metal layer, M2 represents a second metal layer, M3 represents a third metal layer, M4 represents a fourth metal layer, and the spacing s1 is the same as the spacing s1 in FIG. 3. Accordingly, GND traces G and signal traces S1-S16 can be alternatively disposed according to interconnect routing rule.

Figure 9:
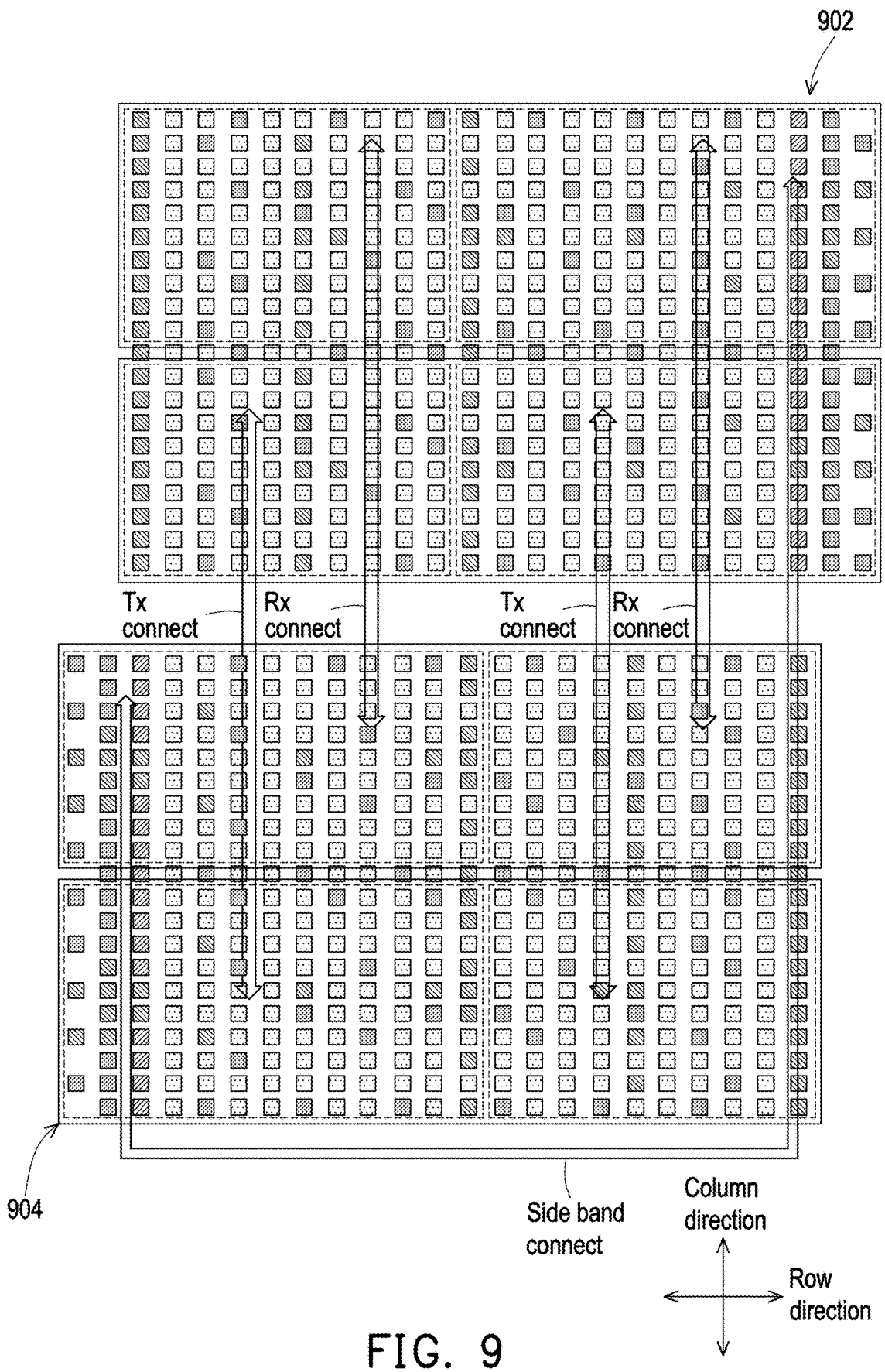
FIG. 9 is an UCIe bump map of the example based on the first embodiment of the invention.

FIG. 9 is an UCIe bump map of above example based on the first embodiment of the invention.

Referring to FIG. 9, a plan view of a first bump map 902 in response to a first die and a second bump map 904 in response to a second die for W-E interconnection is shown. In one embodiment, the first die is, for instance, a SOC die, and the second die is, for instance, a HBM die. The first bump map 902 and the second bump map 904 have the same configuration as the second bumps $204_{11\text{-}63}$ in FIG. 2, wherein bumps with different types represent different transmission signals. Since the first bump map 902 and the second bump map 904 are in-line bump maps, there is space for more traces as shown in FIG. 3 to accomplish W-E interconnection. The first bump map 902 may be laterally offset along the row direction relative to the second bump map 904 so that receiver region (RX) connect and transmitter region (TX) connect can be straight line for minimum distance. After signal integrity co-simulated analyses, eye-diagram co-simulated results show pass at UCIe spec. In addition, side band connect is used to route slow speed signals, and thus it is not necessary to be straight line.

Figure 10:
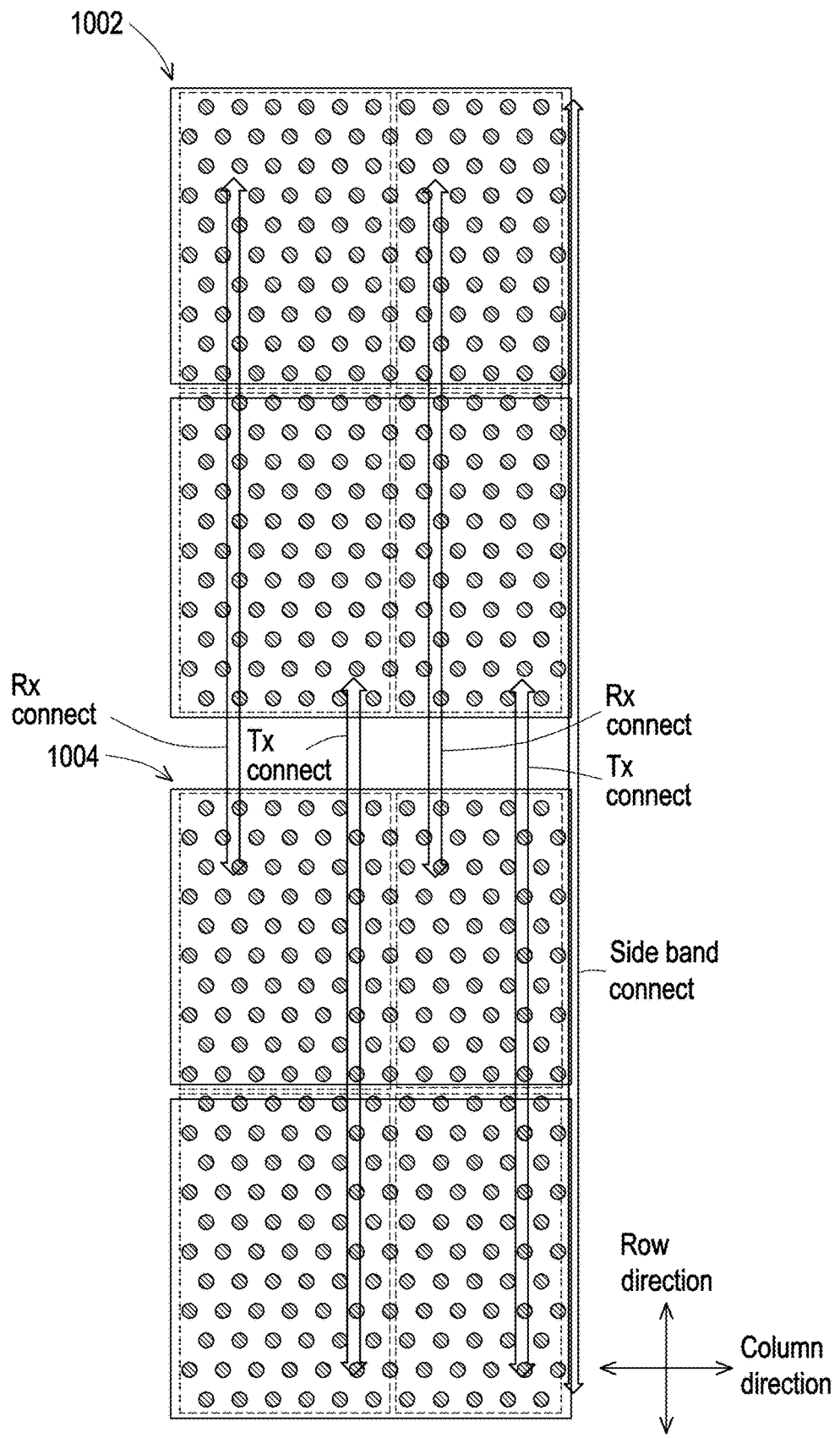
FIG. 10 is an UCIe bump map of one example based on the second embodiment of the invention.

FIG. 10 is an UCIe bump map of another example based on the second embodiment of the invention.

Referring to FIG. 10, a plan view of a first bump map 1002 in response to a first die and a second bump map 1004 in response to a second die for N-S interconnection is shown. The communication interface structure in the second embodiment of the invention can be used for UCIe package. The first bump map 1002 and the second bump map 1004 have the same configuration as the second bumps 504 in FIG. 5. Since the first bump map 1002 and the second bump map 1004 are stagger bump maps, there is space for more traces as shown in FIG. 6 to accomplish N-S interconnection. The first bump map 1002 is aligned to the second bump map 1004 along the row direction, and RX connect and TX connect are also straight line for minimum distance. Since side band connect is used to route slow speed signals, the transmission distance thereof can be longer than RX connect or TX connect.

In summary, since the invention converts stagger bumps to In-line for Die-to-Die interconnection, the communication interface structure can enhance signal integrity performance, and the communication interface structure supports two-slice W-E Die-to-Die interconnect. Therefore, the invention can achieve west-east routability without changing the interconnection in die.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A communication interface structure, comprising:
   a plurality of first bumps arranged in a first row-column configuration, wherein the first bumps in neighboring rows are alternately shifted with each other;
   a plurality of second bumps arranged in a second row-column configuration, wherein each of the second bumps in even rows is at a position shifted in a column direction from a center of each of the first bumps in the even rows, and each of the second bumps in odd rows is at a position between two of the second bumps in the even rows in the column direction; and a plurality of conductive lines disposed between the plurality of first bumps and the plurality of second bumps to connect each of the first bumps to each of the second bumps, wherein the communication interface structure is configured to connect a die, the plurality of second bumps is disposed under or over the plurality of first bumps, each of the plurality of first bumps and each of the plurality of second bumps are commonly connected to an under bump of the die, a first end of each of the plurality of conductive lines is configured to connect to each of the plurality of first bumps, a second end of each of the plurality of conductive lines is configured to connect to each of the plurality of second bumps, and each of the plurality of conductive lines has a C-shaped or U-shaped in a plan view.

2. The communication interface structure of claim 1, wherein a row number of the plurality of second bumps is the same as a row number of the plurality of first bumps, and a column number of the plurality of second bumps is a half of a column number of the plurality of first bumps.

3. The communication interface structure of claim 1, further comprising a plurality of first traces disposed at west-east orientation below the plurality of second bumps, and the plurality of first traces are between two of the plurality of second bumps.

4. The communication interface structure of claim 1, further comprising a plurality of second traces disposed at north-south orientation below the plurality of second bumps, and the plurality of second traces are between two of the plurality of second bumps.

5. The communication interface structure of claim 1, wherein the first bumps in the odd rows are aligned with each other, and the first bumps in the even rows are aligned with each other.

6. The communication interface structure of claim 1, wherein the first bumps in neighboring columns are alternately shifted with each other.

7. The communication interface structure of claim 1, wherein a spacing between two of the plurality of second bumps in a row direction is longer than a spacing between one of the plurality of second bumps and one of the plurality of first bumps in the row direction.

8. A die-to-die package, comprising:
a first die and a second die; and
a communication interface structure, connecting the first die to the second die, wherein the communication interface structure comprises:
a plurality of first bumps arranged in a first row-column configuration, wherein the first bumps in neighboring rows are alternately shifted with each other;
a plurality of second bumps arranged in a second row-column configuration, wherein each of the second bumps in even rows is at a position shifted in a column direction from a center of each of the first bumps in the even rows, and each of the second bumps in odd rows is at a position between two of the second bumps in the even rows in the column direction; and a plurality of conductive lines disposed between the plurality of first bumps and the plurality of second bumps to connect each of the first bumps to each of the second bumps, wherein the plurality of second bumps is disposed under or over the plurality of first bumps, each of the plurality of first bumps and each of the plurality of second bumps are commonly connected to an first under bump of the first die or an second under bump of the second die, a first end of each of the plurality of conductive lines is configured to connect to each of the plurality of first bumps, a second end of each of the plurality of conductive lines is configured to connect to each of the plurality of second bumps, and each of the plurality of conductive lines has a C-shaped or U-shaped in a plan view.

9. The die-to-die package of claim 8, wherein a row number of the plurality of second bumps is the same as a row number of the plurality of first bumps, and a column number of the plurality of second bumps is a half of a column number of the plurality of first bumps.

10. The die-to-die package of claim 8, wherein the communication interface structure further comprises a plurality of first traces disposed at west-east orientation below the plurality of second bumps, and the plurality of first traces are between two of the plurality of second bumps.

11. The die-to-die package of claim 8, wherein the communication interface structure further comprises a plurality of second traces disposed at north-south orientation below the plurality of second bumps, and the plurality of second traces are between two of the plurality of second bumps.

12. The die-to-die package of claim 8, wherein the first bumps in the odd rows are aligned with each other, and the first bumps in the even rows are aligned with each other.

13. The die-to-die package of claim 8, wherein the first bumps in neighboring columns are alternately shifted with each other.

14. The die-to-die package of claim 8, wherein a spacing between two of the plurality of second bumps in a row direction is longer than a spacing between one of the plurality of second bumps and one of the plurality of first bumps in the row direction.

15. The die-to-die package of claim 8, wherein the communication interface structure is an interposer or a redistribution layer (RDL).

16. The die-to-die package of claim 8, further comprising an under bump metallization (UBM) structure under the first die and the second die.

17. The die-to-die package of claim 8, wherein the first die is a system on a chip (SOC) die, and the second die is a high bandwidth memory (HBM) die.

18. The die-to-die package of claim 8, wherein the first die is laterally offset along the row direction relative to the second die.

* * * * *